(12) United States Patent
Asai et al.

(10) Patent No.: US 6,547,047 B2
(45) Date of Patent: Apr. 15, 2003

(54) DRUM BRAKE DEVICE

(75) Inventors: Seiji Asai, Okazaki (JP); Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/025,993

(22) Filed: Dec. 26, 2001

(65) Prior Publication Data

US 2002/0092713 A1 Jul. 18, 2002

(30) Foreign Application Priority Data

Dec. 22, 2000 (JP) ........................................ 2000-390388

(51) Int. Cl.$^7$ ................................................ F16D 51/62
(52) U.S. Cl. .......................................... 188/328; 188/78
(58) Field of Search .............................. 188/78, 79.51, 188/79.54, 106 A, 325, 328, 335

(56) References Cited

U.S. PATENT DOCUMENTS 5,070,968 A * 12/1991 Evans ...................... 188/79.64
5,819,887 A * 10/1998 Asai et al. .................... 188/78
6,003,645 A * 12/1999 Asai et al. .................. 188/328
6,065,571 A * 5/2000 Ikeda ...................... 188/79.61
6,302,245 B1 * 10/2001 Ikeda ...................... 188/79.51

FOREIGN PATENT DOCUMENTS

| EP | 0800014 | * | 4/1997 |
| EP | 0836027 | * | 10/1997 |

* cited by examiner

Primary Examiner—Christopher P. Schwartz
(74) Attorney, Agent, or Firm—Apex Juris, pllc; Tracey M Heims

(57) ABSTRACT

A brake structure that prevents damaging the shoe-hold mechanism by way of securing a larger space at a central region of the brake and achieves a long effective and stable brake function. A by-pass hole 60d, through which the shoe-hold pin 41 is freely penetrating, is formed in the brake lever 60 positioned beneath the shoe web 20b of the brake shoe 20, and the stopper portion 60e contacting the shoe rim 20a is formed on the brake lever 60 so as to avoid the collision between the shoe-hold pin 41 and the by-pass hole 60d when the brake lever 60 is in operation.

4 Claims, 5 Drawing Sheets

DRUM BRAKE DEVICE

FIELD OF THE INVENTION

This invention relates to a drum brake device with a mechanical type actuator and especially relates to a structure wherein a larger space is reserved at a central region of the brake so as to extend an effective stroke range of the mechanical type actuator and to maintain the stability of the brake function.

DESCRIPTION OF PRIOR ART

An example of a drum brake device with a mechanical type actuator is disclosed in Publication Number JP09273573, which is hereby incorporated by reference. The structure and action of this type of drum brake device is disclosed well in JP09273573. Therefore, an explanation here will be limited to a general description as to an overall structure and braking action of the drum brake device with reference to FIGS. 1–3 of this invention employing the same basic structure as in JP09273573.

Terms such as "upper" and "lower" or "left" and "right" used herein are explained with reference to FIG. 1. A back plate 10 is a disc-shape as a whole. An axle (not shown in the figures) penetrates into a central hole 10a formed in the center of the back plate 10, and four installation holes 10b are formed around the central hole 10a into which fixing members are inserted to fix the back plate 10 on a stationary part of a vehicle (not shown in the figures).

A pair of brake shoes 20, 30 comprise almost arc-shaped shoe rims 20a, 30a, shoe webs 20b, 30b fixed on inner circumferential surfaces of the shoe rims 20a, 30a designed to make T-shapes when viewed cross-sectionally, and linings 20c, 30c affixed on outer circumferential surfaces of the shoe rims 20a, 30a. One side surface of the shoe rims 20a, 30a is movably put on the back plate 10.

A wheel cylinder 11 of a hydraulic type actuator positioned between upper adjacent ends of the brake shoes 20b, 30b is fixed on the back plate 10 by bolts, and a pair of pistons 11a (one in the right side only in FIG. 1) make slight contact with the upper end surfaces of the shoe webs 20b, 30b. Lower ends of the shoe webs 20b, 30b are supported by an anchor 10c fixed on the back plate 10 by a fixing means, such as rivets.

A pair of shoe-hold mechanisms 40, 50 comprise shoe-hold pins 41, 51 and shoe-hold springs 42, 52. Top ends of the shoe-hold pins 41 and 51, rising from the back plate 10, retain the shoe-hold springs 42, 52, positioned on shoe webs 20b, 30b so as to contract the same to form almost a U-shape, thereby urging the brake shoes 20, 30 toward the back plate 10.

Due to the above configuration, surfaces of the linings 20c, 30c are constantly parallelized, within a certain clearance, to an inner circumferential surface of a brake drum (not shown in the figures). Details of the shoe-hold mechanism 40 at the left side of the figures will be explained later.

A first strut 12 adjacent to the wheel cylinder 11 has a screw mechanism and is extended between both shoe webs 20b, 30b. Extending or shortening the first strut 12 adjusts the clearance between the linings 20c, 30c and the brake drum (not shown in the figures).

A pair of upper and lower shoe-return springs 15, 16 urging the pair of brake shoes 20, 30 to approach each other are stretched between both shoe webs 20b, 30b. This prevents dragging of the linings 20c, 30c when releasing the brake.

The structure of the mechanical type brake mechanism will be explained next.

A brake lever 60 superposed on the shoe web 20b of the left brake shoe 20, positioned between the back plate 10 and the shoe web 20b, but adjacent to the shoe web 20b, has a base portion 60a pivotally supported at a lower end portion of the shoe web 20b by a pin 61. A free end 60b of the brake lever 60 is connected to a cable end 62a of a brake cable 62 functioning as a remote force transmitting member, and a projection 60c formed on an outer circumferential edge of the brake lever 60 near the free end 60b, just like shown in FIG. 1, abuts against an inner circumferential surface of the shoe rim 20a, thereby restricting a returning position of the brake lever 60. A cable guide 10d is fixed on the back plate 10 to smoothly guide the brake cable 62, and a guide pipe 10e fixes one end of an outer casing.

The outer casing is a member to protect the brake cable 62 that may be directly exposed to outside air.

A pivot lever 14 superposed on the shoe web 30b of the right brake shoe 30, positioned between the back plate 10 and the shoe web 30b of the brake shoe 30, has a centrally located protuberance 14a pivotally supported at the central location of the shoe web 30b. A second strut 13 is extended between a lower end of the pivot lever 14 and the lower portion of the brake lever 60, and the upper end of the pivot lever 14 engages with a right end portion of the strut 12.

Details of the shoe-hold mechanism 40 at the left side of FIG. 6 will be explained with reference to the figure.

On end of which has a head 41b wherein the head declines or slopes to meet the stem of the shoe-hold pin in order to allow the pin to swingably move, the other end of which has an enlarged head 41c in order to fix the shoe-hold spring 42.

The head 41b at one end of the shoe-hold pin 41 swingably engages with an engagement hole 10f formed on the back plate 10, and the head 41c at the other end of the shoe-hold pin 41 penetrates through a by-pass hole 20d formed in the shoe web 20b and a by-pass hole 42b formed in the bottom branch 42a of the shoe-hold spring 42, wherein a top branch 42c of the shoe-hold spring 42 facing the bottom branch 42a of the shoe-hold spring 42 is fixed by the shoe-hold pin 41.

As such, the brake shoe 20 is resiliently supported on the back plate 10.

In order to keep a larger space at a central region of the brake, the brake lever 60 is positioned such that its outer circumferential edge is adjacent to the stem 41a of the shoe-hold pin 41.

An explanation as to an automatic shoe clearance adjustment mechanism automatically adjusting a clearance between the linings 20c, 30c and the brake drum (not shown in the figures) and an automatic stroke adjustment mechanism automatically adjusting a stroke of the brake lever 60 according to the lining wear of the linings 20c, 30c is omitted since it is not directly related to the concept of this invention.

In addition, the automatic stroke adjustment mechanism is configured in the second strut 13, and an explanation as to its structure and action is disclosed in Publication Number JP10110758 which is hereby incorporated by reference. Braking action of the brake device with the above-structure will be explained with reference to FIG. 1.

A hydraulic actuator action will be explained first. If a wheel cylinder 11 is pressurized to push both pistons (where only right half of the wheel cylinder 11 with a piston 11a is shown in FIG. 1), the brake shoes 20, 30 move outward with a point of abutment with the anchor 10c as a pivot point, and the linings 20c, 30c frictionally engage with the brake drum (not shown in FIG. 1).

Either brake shoe 20 or brake shoe 30, where the brake drum moves in a rotational direction about the brake shoe, functions as a leading shoe, and the remaining brake shoe of the two, not positioned in a rotational direction functions as a trailing shoe, thereby operating and functioning as a leading trailing type drum brake device with a stable braking effect.

A mechanical type actuator action will be explained next. If the free end 60b of the brake lever 60 is pulled via a brake cable 62, the brake lever 60 rotates clockwise with the pin 61 as a pivot point, and the operation force is transmitted to the second strut 13, the pivot lever 14, and the first strut 12 respectively so as to move the left brake shoe 20 outward to cause a frictional engagement with the brake drum.

Simultaneously, the right brake shoe 30 moves outward via the protuberance 14a of the pivot lever 14 to cause a frictional engagement with the brake drum.

An outward force acts on the lower end of the left brake shoe 20 via the pin 61. A frictional force of either the brake shoe 20 or the brake shoe 30 working as a primary shoe in relation to a rotational direction of the brake drum is transmitted to the remaining brake shoe of the two working as a secondary shoe via the first strut 12 so as to cause a braking force, thereby functioning as a duo servo type drum brake device with a highly effective braking force. Accordingly, this drum brake device is defined to be a dual mode type drum brake device.

A conventional drum brake device has the following drawbacks: Recently, for a safety reason, the number of vehicles utilizing anti-lock brake control devices have been increasing.

For a vehicle with the anti-lock brake control device, a sensor wheel rotating together with the brake drum is positioned at the central region of the brake, and a sensor faces an outer circumferential surface of the sensor wheel with a certain clearance. A body of the sensor penetrates through a through hole 10g (see FIG. 1) formed on the back plate 10 to be installed. Accordingly, unless a sufficiently effective brake lever stroke is reserved, the sensor may be damaged.

In a four-wheel drive vehicle, because a hub portion of the brake drum is positioned at the central region of the brake, an insufficient effective brake lever stroke, just like the above case, may damage the hub portion and the brake lever. If the hub portion of the brake drum is positioned at the central region of the brake, in order to avoid any interference with the same, pitches of the installation holes on the back plate become wider requiring a sufficient space necessary for installing fixing members. Considering the above drawbacks, it is desirable to keep a larger space at the central region of the brake. For example, U.S. Pat. No. 3,255,849 and Publication Number JP58052342U disclose the structure employing a means to keep a larger space at the central region of the brake.

In these configurations, the shoe-hold pin 61 rises from the back plate and passes or penetrates through the by-pass hole. The plated brake lever is positioned beneath the shoe web and parallel to the back plate with a certain clearance, and the outermost circumferential edge of the brake lever approaches the inner circumferential surface of the shoe rim.

The brake lever disclosed in the drawings of U.S. Pat. No. 3,255,849 only suggests a by-pass hole on a member adjacent to a shoe web, from which a shoe-hold pin is freely penetrated through. However, the structure of this conventional drum brake device has the following drawbacks:

Because the brake lever is capable of stroking until colliding against the shoe-hold pin (in particularly, the brake lever disclosed in Utility Model Number JP0710110 is collided against the shoe-hold pin to forcibly restrict the strokability), repeated collision between the brake lever and the shoe-hold pin may cause damage to the shoe-hold pin.

If the shoe-hold-pin is deformed or leaned to abnormally deflect the shoe-hold spring, thereby deteriorating the spring effect.

This invention was made to remove the aforementioned drawbacks, and an object of this invention is to prevent from damaging the shoe-hold mechanism by way of securing a larger space at a central region of the brake and is to achieve a long effective and stable brake function.

SUMMARY OF INVENTION

This invention is a drum brake device comprising a brake shoe being movably disposed parallel to a surface on a fixed back plate, a brake lever superposed positioned beneath a shoe web of the brake shoe, a base end of which pivotally supported at one end of the shoe web, a shoe hold mechanism, composed of a shoe-hold pin, rising from a back plate, and a shoe-hold spring, laid on the brake shoe, said shoe-hold pin contracting said shoe-hold spring so as to urge the brake shoe toward the back plate and to hold the brake shoe. A remote control device pulls a free end of said brake lever to cause a frictional engagement between the brake shoe and a brake drum, wherein a by-pass hole, through which said shoe-hold pin freely penetrates, is formed in the brake lever, and a stopper means, preventing the by-pass hole of the brake lever from colliding against the shoe-hold pin in the brake lever operational direction, is provided on the drum brake device.

This invention still further is the drum brake device as above, wherein the stopper means comprised a stopper portion extending from lever base in a different direction from a direction from a lever base to a lever free end, the stopper portion is formed so as to collide against the brake shoe to avoid the by-pass hole from colliding against the shoe-hold pin.

This invention still further is the drum brake device as above, wherein a stopper portion is formed on the brake lever so as to collide against a rim of the brake shoe to avoid the by-pass hole from colliding against the shoe-hold pin.

This invention yet further is the drum brake device as above, wherein a stopper portion is formed on the brake lever so as to collide against a web of the brake shoe to avoid the by-pass hole from colliding against the shoe-hold pin.

BRIEF DESCRIPTION OF DRAWINGS

The above and other objects and advantages of the present invention will become readily apparent by reference to the following detailed description when considered in conjunction with the accompanying drawings.

DETAILED DESCRIPTION OF THE PREFERRED EMBODIMENTS

An example of a drum brake device utilizing this invention is explained below with reference to the accompanied drawings.

Figure 1:
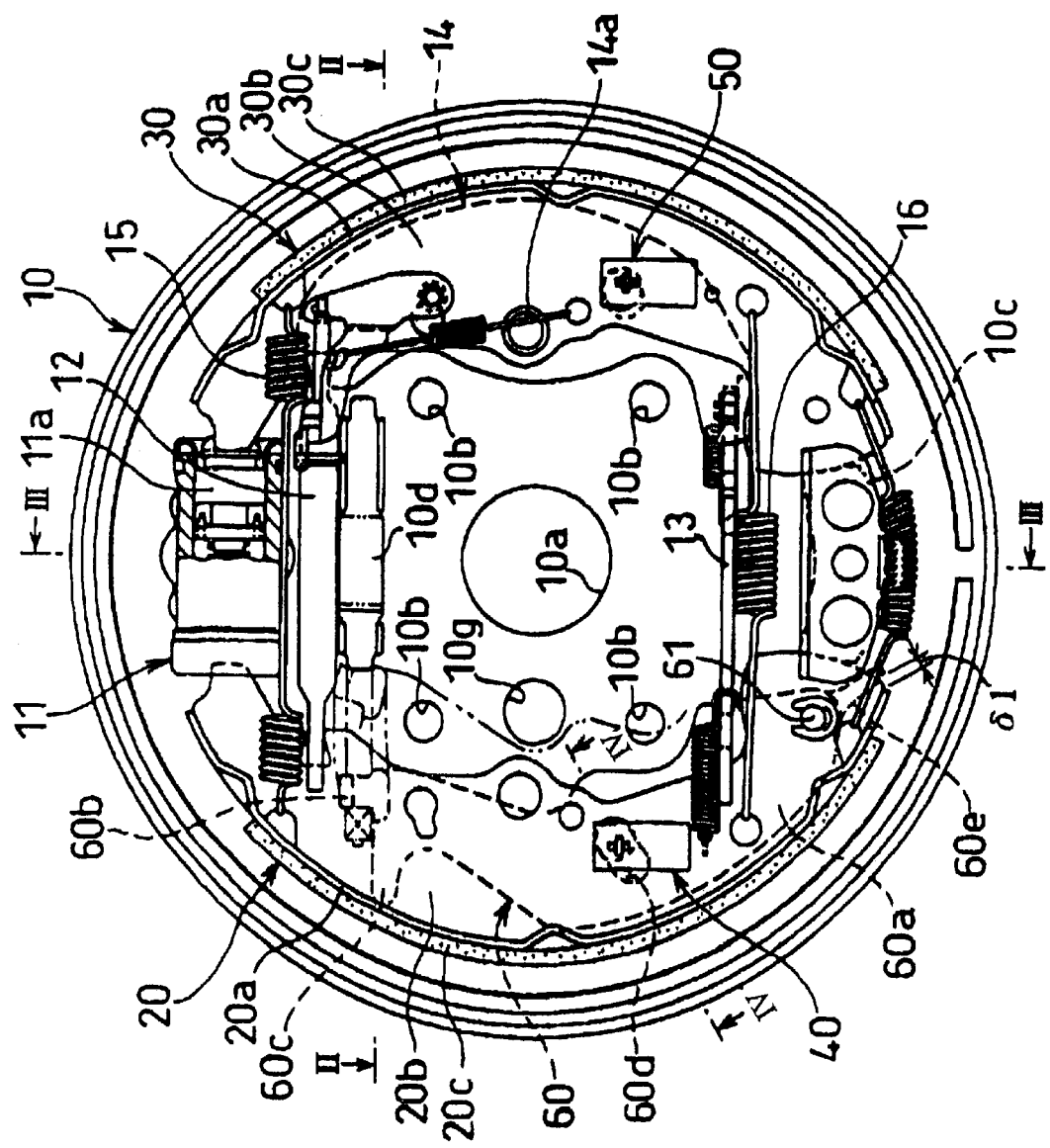
FIG. 1 is a plan view of a drum brake device as to Example 1 of this invention.
Figure 2:
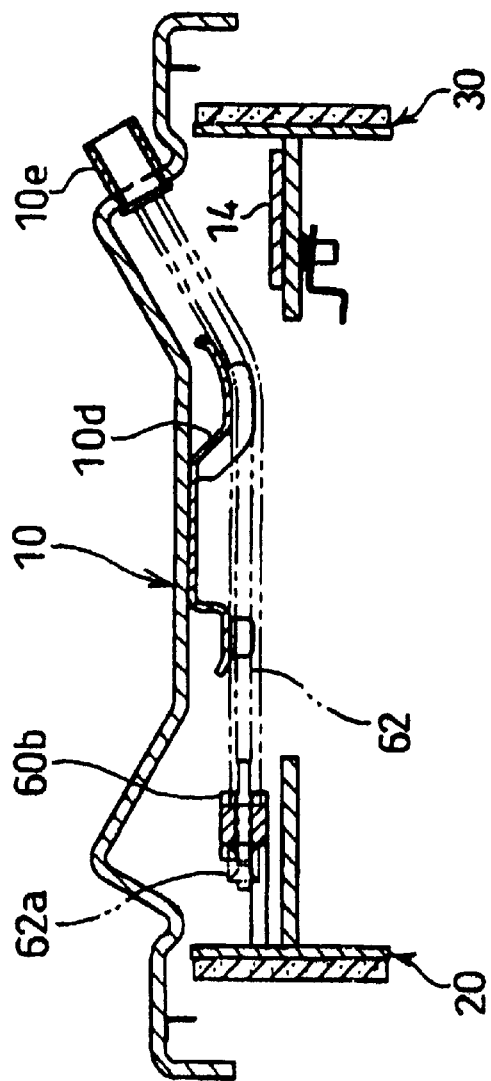
FIG. 2 is a cross-section view of FIG. 1 taken along the line II—II.
Figure 3:
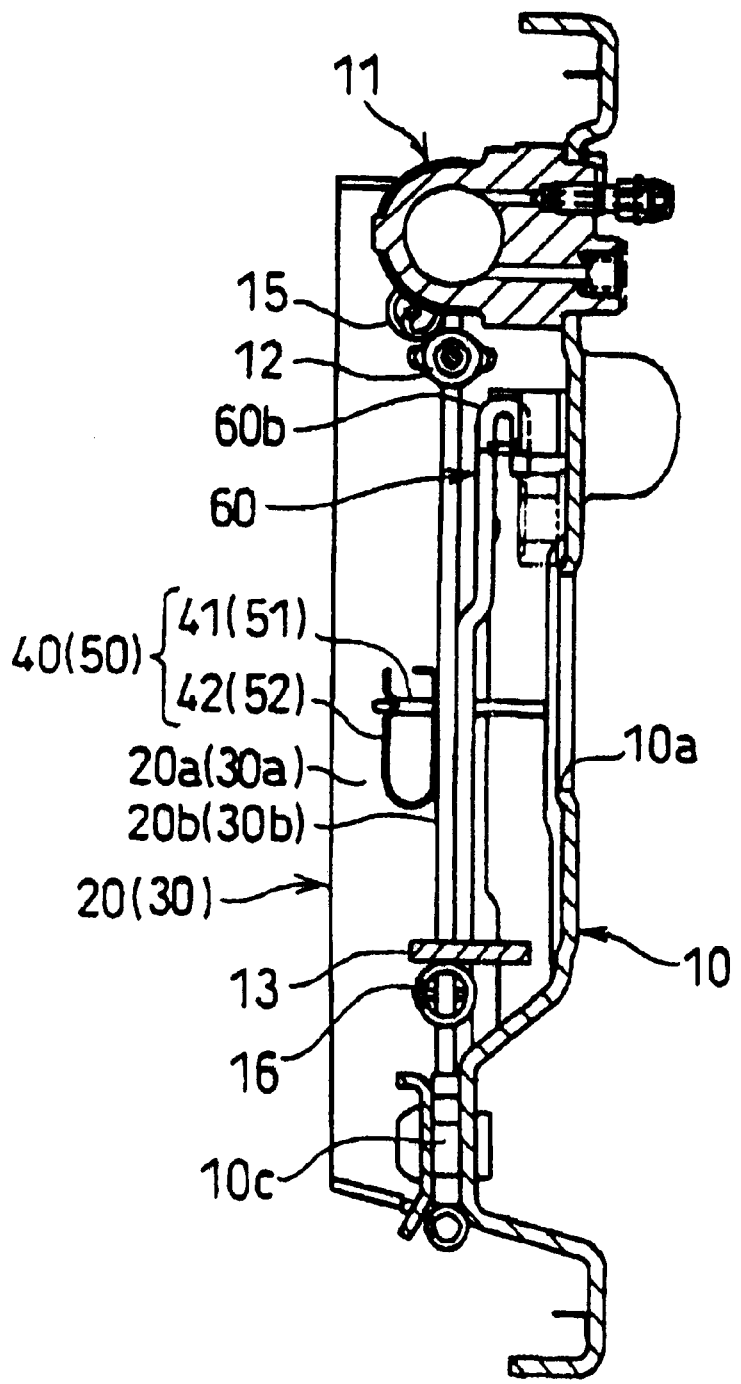
FIG. 3 is a cross-section view of FIG. 1 taken along the line III—III.

For the purpose of explanation, the same reference numbers as in the aforementioned conventional art shown in FIGS. 1–3 will be assigned to identical parts or sites having the same functions as described in the following example. Furthermore, the explanation of the components and the brake action are omitted.

Figure 4:
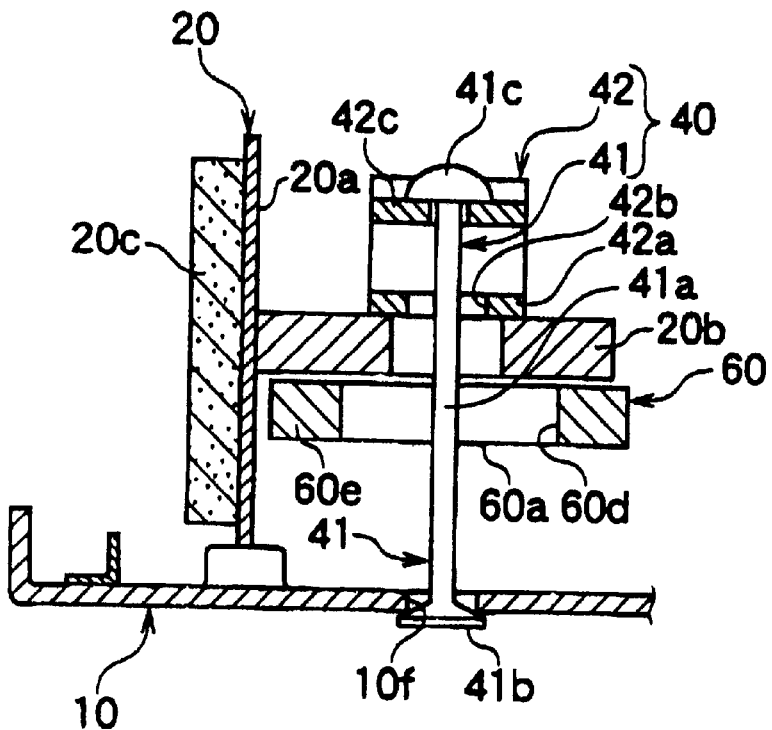
FIG. 4 is a cross-section view of FIG. 1 taken along the line IV—IV.

Example 1 of this invention will be explained with reference to FIG. 4 in addition to FIGS. 1 and 3.

In this example, the by-pass hole 60d through which the shoe-hold pin 41 freely penetrates and the stopper portion 60e extending from the lever base in the direction from lever base 60a to the lower end of the shoe rim 20a, are formed in the brake lever 60.

The brake lever 60 may be placed close to the inner circumferential surface of the shoe rim 20a without colliding against the shoe-hold pin 41, and the back end of the brake lever 60 may be abutted against the inner circumferential surface of the shoe rim 20a to be substituted for the projection 60c formed near the free end 60b, thereby securing a large space at the central region of the brake. Accordingly, the configuration of this invention provides a long effective stroke of the brake lever 60, thereby avoiding any interference with a sensor for an anti-lock brake and a brake drum hub and facilitating the assembly of the brake device on a vehicle.

The stopper portion 60e of the brake lever 60 is formed with a predetermined clearance δ1 from a lower edge of the shoe rim 20a. When the brake lever 60 is in operation as appeared in a virtual line, the clearance δ1 is designed such that the by-pass hole 60d does not collide against the shoe-hold pin 41 or an inner edge of the brake lever 60 at a brake center side does not collide against the sensor for the anti-lock brake or the brake drum hub.

In the above-explained configuration, if the brake lever 60 is operated when a clearance between the brake shoes 20, 30 and the brake drum is-large, the stopper portion 60e collides against the shoe rim 20a to be together with the left brake shoe 20 and then pushes the right brake shoe 30 to frictionally engage with the brake drum, thereby eliminating a chance of non-braking.

Figure 5:
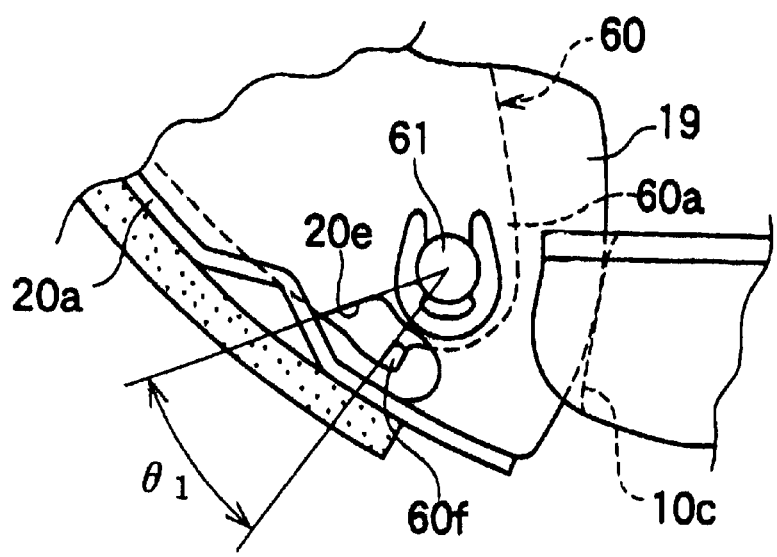
FIG. 5 is a plan view of a modified example of this invention.
Figure 6:
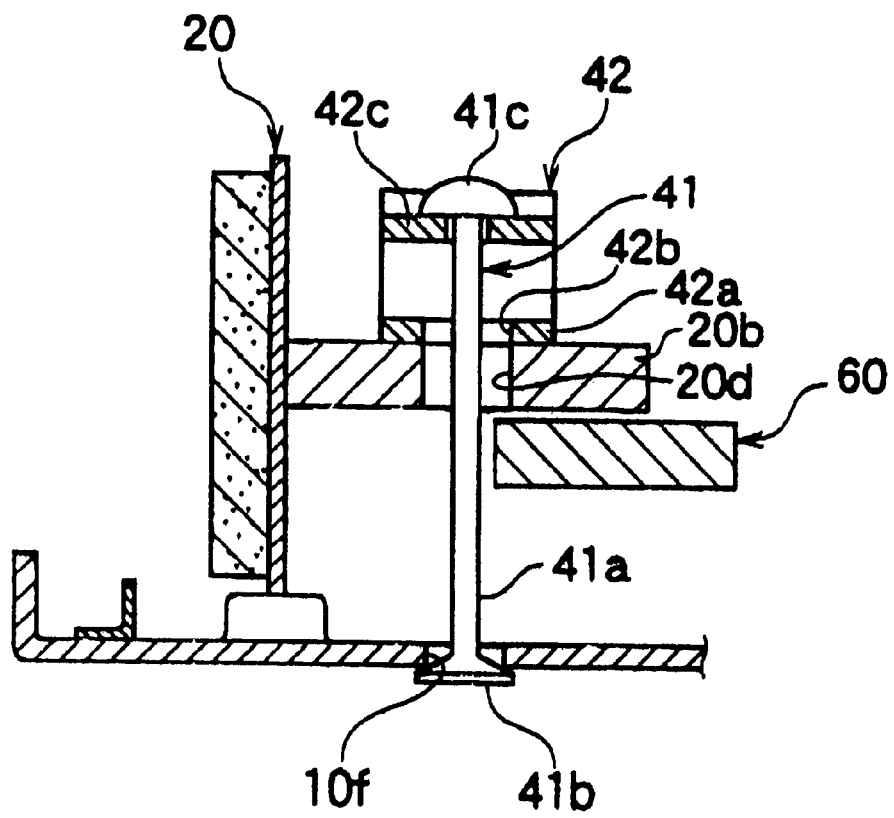
FIG. 6 is a cross-section view of an example of the shoe-hold mechanism of the prior art.

With reference to FIG. 5, a modified example of a stopper means restricting an acceptable stroke of the brake lever 60. In this example, the stopper means is provided between the brake lever 60 and the shoe web 20b in order to restrict the acceptable stroke of the brake lever 60. That is, the brake lever 60 has an extended portion projecting from the lever base 60a toward the outside of the brake, and the stopper portion 60f as a projection is formed at the end of the extended portion projecting toward the shoe web 20b.

On the other hand, an outer circumferential edge of the shoe web 20b has a notched groove 20e, wherein the notched groove 20e and an inner circumferential surface of the shoe rim 20a form a rectangular hole, freely fitting the stopper portion 60f therein with an angle θ1 in the clockwise direction with the pin 61 of the brake lever 60 as the fulcrum.

Accordingly, the angle θ1 becomes an acceptable amount of rotation of the brake lever 60, thereby providing similar effects as described in Example 1, and an explanation of which is omitted.

However, this invention is not limited to Example 1 and the modified example explained herein. There are numerous possible modifications, for example, the stopper portion 60e of the brake lever 60 may be designed to collide against an inner circumferential surface of the shoe rim 20a, or when the stopper portion 60f is to be collided against the inner edge of the shoe web 20b at the brake center side.

The above Example 1 and modified examples are explained in a dual mode drum brake device; however, applications of this invention is not limited to the dual mode drum brake but for example a publicly known leading-trailing type drum brake, duo servo type drum brake or a drum brake with a single shoe as shown in Publication Number JP09324829.

Because of the above-described structure, the drum brake device of this invention has the following advantages.

The by-pass hole, through which the shoe-hold pin standing on the back plate and the stopper preventing the collision between the shoe-hold pin and the by-pass hole when the brake lever is in operation, are formed on the brake lever superposed under the shoe web and parallel to the back plate.

Accordingly, the configuration of this invention provides a larger space at the central region of the brake, thereby providing a long effective stroke of the brake lever, avoiding any interference with a sensor for an anti-lock brake or a brake drum hub, and facilitating the assembly of the brake device on a vehicle.

In this invention the shoe-hold pin does not collide against the by-pass hole in the brake lever, thereby avoiding damage to the shoe-hold pin and also avoids deterioration of the spring affected by the abnormal deflection of the shoe-hold spring due to the deformation and/or leaning of the shoe-hold pin.

If the stopper means restricting the acceptable stroke of the brake lever is provided at an opposite side to the free end side of the brake lever, no special design is necessary in the space at the central region of the brake.

The by-pass hole and the stopper portion of the brake lever and the notched groove of the shoe web may be formed by press, which facilitates the processing and reduces the manufacturing cost.

This invention can be applied to various types of drum brakes employing a dual mode type, leading trailing type, duo servo type, and a type of a drum brake with single brake shoe and provides a wide range of applicability.

What we claim is:

1. A drum brake device comprising a brake shoe being movably disposed parallel to a surface on a fixed back plate, a parking brake actuating lever superposed on a shoe web of the brake shoe, positioned between the back plate and the shoe web, but adjacent to the shoe web, a base end of which is pivotally supported at one end of the shoe web, a shoe hold mechanism, composed of a shoe-hold pin, rising from a back plate, and a shoe-hold spring, laid on the brake shoe, said shoe-hold pin contracting said shoe-hold spring so as to urge the brake shoe toward the back plate and to hold the brake shoe, and a remote control device which pulls a free end of said parking brake actuating lever to cause a frictional engagement between the brake shoe and a brake drum, wherein a by-pass hole, through which said shoe-hold pin freely penetrates, is formed in the parking brake actuating lever, and a stopper means, preventing the by-pass hole of the parking brake actuating lever from colliding against the shoe-hold pin in the parking brake actuating lever operational direction, is provided on the drum brake device.

2. The drum brake device as claimed in claim 1, wherein the stopper means comprised a stopper portion extending from a lever base in a different direction from a direction from the lever base to a lever free end, the stopper portion is formed so as to collide against the brake shoe to avoid the by-pass hole from colliding against the shoe-hold pin.

3. The drum brake device as claimed in claim 2, wherein the stopper portion is formed on the brake lever so as to collide against a rim of the brake shoe to avoid the by-pass hole from colliding against the shoe-hold pin.

4. The drum brake device as claimed in claim 2, wherein the stopper portion is formed on the parking brake actuating lever so as to collide against a web of the brake shoe to avoid the by-pass hole from colliding against the shoe-hold pin.

* * * * *